United States Patent
Ha et al.

(10) Patent No.: US 11,109,265 B2
(45) Date of Patent: Aug. 31, 2021

(54) METHOD AND APPARATUS FOR TRANSMITTING CONTROL MESSAGE IN SOFTWARE DEFINED NETWORK-BASED MOBILE COMMUNICATION SYSTEM

(71) Applicant: Samsung Electronics Co., Ltd., Suwon-si (KR)

(72) Inventors: Sanghyun Ha, Suwon-si (KR); Gyuil Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/063,396

(22) PCT Filed: Jan. 13, 2017

(86) PCT No.: PCT/KR2017/000493
§ 371 (c)(1),
(2) Date: Jun. 18, 2018

(87) PCT Pub. No.: WO2017/123059
PCT Pub. Date: Jul. 20, 2017

(65) Prior Publication Data
US 2019/0007862 A1    Jan. 3, 2019

(30) Foreign Application Priority Data
Jan. 13, 2016    (KR) .................. 10-2016-0004009

(51) Int. Cl.
*H04W 28/02* (2009.01)
*H04L 12/841* (2013.01)
(Continued)

(52) U.S. Cl.
CPC ......... *H04W 28/0278* (2013.01); *H04L 47/28* (2013.01); *H04L 47/30* (2013.01);
(Continued)

(58) Field of Classification Search
CPC .. H04W 28/0278; H04W 88/16; H04L 47/30; H04L 47/28; H04L 45/64; H04L 47/14; H04L 47/12
See application file for complete search history.

(56) References Cited

U.S. PATENT DOCUMENTS 8,861,535 B2 * 10/2014 Koodli .................. H04L 47/14
370/401
9,038,151 B1    5/2015 Chua et al.
(Continued)

FOREIGN PATENT DOCUMENTS

KR    10-2015-0079477 A    7/2015
WO       2015/000516 A1    1/2015

OTHER PUBLICATIONS

Sajad Shirali-Shahreza et al: "ReWiFlow: Restricted Wildcard OpenFlow Rules", Computer Communication Review, ACM, New York, NY, US, vol. 45, No. 5, pp. 29-35, XP0580731 09, ISSN: 0146-4833,DOI: 10.1145/2831347.2831352; Sep. 30, 2015.
(Continued)

*Primary Examiner* — Tejis Daya
(74) *Attorney, Agent, or Firm* — Jefferson IP Law, LLP (57) ABSTRACT

The present invention relates to a method for transmitting a control message by a control entity in a software defined network-based mobile communication system, the method comprising the steps of: detecting the occurrence of at least one event associated with at least one terminal; buffering the at least one event until a predetermined condition is satisfied; and transmitting, to a switching entity, a control message corresponding to the at least one buffered event when the predetermined condition is satisfied. However, the present invention is not limited to the above embodiment, and other embodiments are possible.

9 Claims, 5 Drawing Sheets

(51) Int. Cl.
  *H04L 12/835* (2013.01)
  *H04W 88/16* (2009.01)
  *H04L 12/715* (2013.01)
  *H04L 12/801* (2013.01)

(52) U.S. Cl.
  CPC ............ *H04W 88/16* (2013.01); *H04L 45/64* (2013.01); *H04L 47/12* (2013.01); *H04L 47/14* (2013.01)

(56) References Cited

U.S. PATENT DOCUMENTS

| | | | | |
|---|---|---|---|---|
| 2011/0286324 | A1* | 11/2011 | Bellagamba | H04L 41/0677 370/219 |
| 2012/0300615 | A1 | 11/2012 | Kempf et al. | |
| 2014/0003422 | A1* | 1/2014 | Mogul | H04L 41/0686 370/389 |
| 2014/0219287 | A1* | 8/2014 | Birke | H04L 47/621 370/412 |
| 2014/0233393 | A1 | 8/2014 | Ueno | |
| 2014/0269320 | A1* | 9/2014 | DeCusatis | H04L 47/11 370/236 |
| 2014/0281669 | A1* | 9/2014 | DeCusatis | G06F 11/2005 714/4.11 |
| 2014/0325038 | A1* | 10/2014 | Kis | H04L 41/0803 709/220 |
| 2015/0009830 | A1* | 1/2015 | Bisht | H04L 47/125 370/236 |
| 2015/0023347 | A1* | 1/2015 | Kapur | H04L 12/1886 370/390 |
| 2015/0110121 | A1* | 4/2015 | Tan | H04W 76/12 370/401 |
| 2015/0186516 | A1 | 7/2015 | Tran et al. | |
| 2015/0195183 | A1* | 7/2015 | Park | H04L 45/021 709/242 |
| 2015/0365325 | A1* | 12/2015 | Hwang | H04L 47/70 370/230 |
| 2016/0080263 | A1* | 3/2016 | Park | H04L 45/745 370/392 |
| 2016/0142977 | A1* | 5/2016 | Hoffmann | H04W 52/0225 370/311 |
| 2016/0294734 | A1* | 10/2016 | Jang | H04L 41/0654 |
| 2016/0301603 | A1* | 10/2016 | Park | H04L 41/0893 |
| 2016/0337236 | A1* | 11/2016 | Hsu | H04L 29/12028 |
| 2017/0085501 | A1* | 3/2017 | Utgikar | H04L 49/25 |
| 2017/0126618 | A1* | 5/2017 | Bhaskaran | H04L 61/2007 |
| 2017/0142010 | A1* | 5/2017 | Mathew | H04L 12/6418 |
| 2017/0142034 | A1* | 5/2017 | K | H04L 1/188 |
| 2017/0222931 | A1* | 8/2017 | Turner | H04L 12/6418 |
| 2017/0230284 | A1* | 8/2017 | Yamashita | H04L 45/38 |
| 2017/0251516 | A1* | 8/2017 | Bangolae | H04W 76/27 |
| 2017/0332438 | A1* | 11/2017 | Olsson | H04W 76/38 |
| 2018/0006833 | A1* | 1/2018 | Tatlicioglu | H04L 45/48 |
| 2018/0083876 | A1* | 3/2018 | Sharma | H04L 45/745 |
| 2019/0007303 | A1* | 1/2019 | Wackerly | H04L 45/22 |
| 2019/0007862 | A1* | 1/2019 | Ha | H04W 28/0278 |

OTHER PUBLICATIONS

European Search Report dated Nov. 7, 2018; Application No. 17738688.5-1215.

\* cited by examiner

METHOD AND APPARATUS FOR TRANSMITTING CONTROL MESSAGE IN SOFTWARE DEFINED NETWORK-BASED MOBILE COMMUNICATION SYSTEM

TECHNICAL FIELD

The present invention relates to a method and apparatus for transmitting a control message in a software defined network-based mobile communication system.

BACKGROUND ART

Software-define network (SDN) is a new network organizing technology that decouples the control plane from the data plane in the network such that a controller to which the control plane is concentrated decides how to handle network traffic and the data plane forwards traffic according to the decisions made by the control plane.

In particular, the controller is capable of handling various types of traffic based on the network information by means of various northbound application programming interfaces (APIs) and northbound API-based programming. OpenFlow is a protocol that enables the SDN to operate as above. The OpenFlow protocol makes it possible to exchange forwarding information between a controller and a switch and transfer a state of the switch and traffic information to the controller.

Standardization of OpenFlow protocol, which provides a basis for SDN technology, is already underway. Typically, the OpenFlow protocol is applied to switches connecting servers on the data plane. There has been relatively little discussion on whether to adopt the OpenFlow protocol for an up-to-date communication network such as a long term evolution (LTE) network. However discussion is underway for use of the SDN technology appropriately and efficiently.

DISCLOSURE OF INVENTION

Technical Problem

The present invention aims to provide a method and apparatus for effectively reducing signaling overhead between a controller and switches in an SDN-based mobile communication network.

Solution to Problem

In accordance with an aspect of the present invention, a control message transmission method of a control entity in a software defined network-based mobile communication system includes detecting occurrence of at least one event related to at least one terminal; buffering the at least one event until a predetermined condition is fulfilled; and transmitting, if the predetermined condition is fulfilled, a control message corresponding to the buffered at least one event to a switching entity.

In accordance with another aspect of the present invention, a control message transmission method of a switching entity in a software defined network-based mobile communication system includes detecting arrival of a packet related to at least one terminal from an external network; buffering the packet until a predetermined condition is fulfilled; and transmitting, if the predetermined condition is fulfilled, a control message corresponding to the buffered packet to a control entity.

In accordance with another aspect of the present invention, a control entity of a software defined network-based mobile communication system includes a transceiver configured to transmit and receive signals and a processor configured to control to detect occurrence of at least one event related to at least one terminal; buffer the at least one event until a predetermined condition is fulfilled; and transmit, if the predetermined condition is fulfilled, a control message corresponding to the buffered at least one event to a switching entity.

In accordance with still another aspect of the present invention, a switching entity of a software defined network-based mobile communication system includes a transceiver configured to transmit and receive signals; a switching unit configured to switch packet forwarding; and a processor configured to control to detect arrival of a packet related to at least one terminal from an external network; buffer the packet until a predetermined condition is fulfilled; and transmit, if the predetermined condition is fulfilled, a control message corresponding to the buffered packet to a control entity.

Advantageous Effects of Invention

The present invention is advantageous in terms of efficiently reducing control messages that increase in number because of the separation of the controller and switches in an SDN-based mobile communication network.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Various embodiments of the present invention exemplify how to optimally adopt an SDN-based cloud computing system to a 3rd generation partnership project (3GPP) evolved packet core (EPC) network.

The SDN is one of the key technologies for a $5^{th}$ generation (5G) mobile communication system as a standard for efficiently administrating a communication system by separating the control function from the network devices that forward the traffic.

Figure 1:
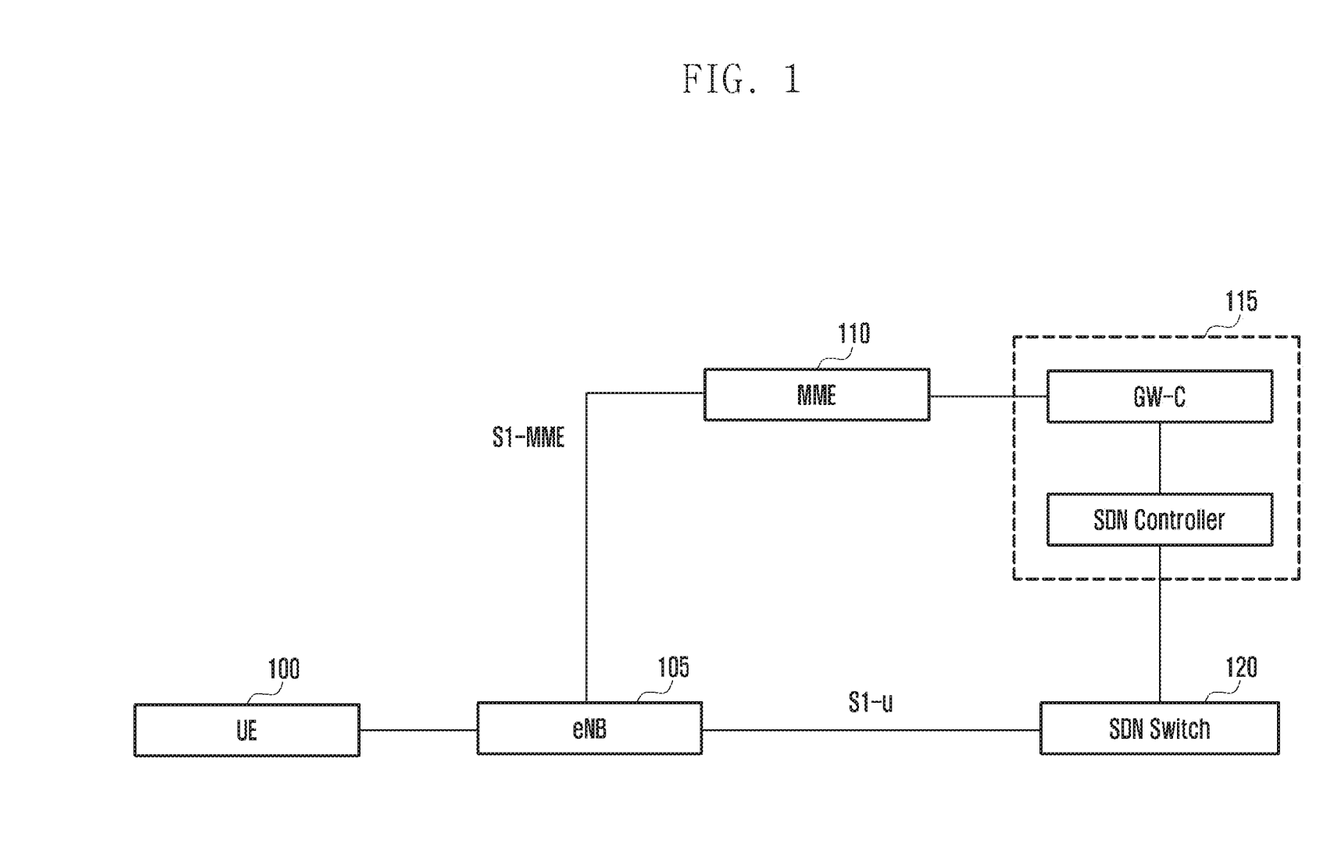
FIG. 1 is a schematic diagram illustrating architecture of an SDN-based mobile communication system.

FIG. 1 is a schematic diagram illustrating architecture of an SDN-based mobile communication system.

In reference to FIG. 1, the SDN-based mobile communication system may include a terminal (or user equipment (UE)) 100, a base station (or evolved Node B (eNB)) 105, a mobility management entity (MME) 110, a control entity 115, and a switching entity 120. The control entity 115 denotes an entity that is responsible for control functions in SDN, but it is not limited by its name. The switching entity 120 denotes an entity including an SDN switch that is responsible for a traffic forwarding function, but it is not limited by its name.

The UE 100 may connect to the wireless communication network via the eNB 105.

The eNB 105 provides the UE 100 with a radio access service for connection between the UE 100 and an external network (not shown).

The MME 110 manages mobility of the UE 100. The MME 110 connects to the eNB 105 through an S1-MME interface. That is, the MME 110 tracks and manages the locations of the UE 100, i.e., in which cell and which area the UE 100 is located.

The control entity 115 may send a forward path configuration command to the switching entity 120 based on the OpenFlow protocol. The control entity 115 may include a gateway controller (GW-C) and an SDN controller. The GW-C is responsible for controlling the switching entity 120 via the SDN controller and processing signal messages to an SGW, PGW, or SPGW type NE according to the 3GPP standard. The SDN controller is responsible for topology management, path management, and SDN switch selection of the switching entity 120.

The switching entity 120 is responsible for processing user traffic to the SGW, PGW, or SPGW type NE according to the 3GPP standard. The switching entity 120 connects to the eNB 105 through an S1-u interface. The switching entity 120 may configure a path according to the OpenFlow protocol. In detail, the switching entity 120 may take charge of the functions of bearer setup and resource allocation to the UE and flow processing based on a policy and charging control (PPC) rule. The path configuration is controlled based on a control message from the control entity 115. The switching entity 120 executes an OpenFlow agent and, if the OpenFlow agent detects a non-configured flow packet, the switching entity 120 reports the receipt of the non-configured flow packet to the control entity 115 and configures a path under the control of the control entity 115.

For example, the GW-C of the control entity 115 may send a control message to the SDN switch through IPC interface or API provided by the SDN controller to update flow table entries. A procedure for generating and updating a GTP User Plane Tunnel in the EPC network is processed by a PDN connection (or EPS session) or bearer according to the standard. However, if it occurs that the flow table entry modification (e.g., creation, modification, and deletion) is made to a plurality of PDN connections (or EPS sessions) or bearers for a subscriber (UE), this may increase the number of control messages in proportion to the PDN connections (or EPS sessions) or bearers established between the GW-C and SDN controller and the SDN switch.

If a downlink user packet for the UE 100 in an idle station arrives, the SDN switch needs to transfer the packet to the GW-C via the SDN controller. This operation is called Network Initiated Servicer Request Procedure in the 3GPP standard. In this case, if the SDN switch transmits a control message immediately to the SDN controller by the packet, this is likely to cause unnecessary network overload.

According to various embodiments of the present invention, although the GTP User Plane Tunnel creation or update procedure is performed by a PDN connection (or EPC session) or bearer in the EPC network as specified in the standard, the control entity 115 controls that the GTP User Plane Tunnel creation or update procedure between the GW-C and the SDN switch and the SDN controller to is performed by subscriber or when a predetermined condition (time or number of events) is fulfilled, thereby reducing the number of control message to be processed by the switching entity 120 and maximizing the efficiency.

In order to protect against unnecessary paging in the course of the UE-initiated Service Request Procedure, the switching entity 120 may hold transmitting the control message from the SDN switch to the SDN controller until a predetermined condition (time or number of packet) is fulfilled, in spite of continuous traffic arrival from the external network, thereby reducing the number of control messages being transmitted from the SDN switch to the GW-C via the SDN controller.

In an IP network, it is preferable to use the IP packet with the maximum size available without fragmentation in order to improve the data rate efficiency for both the IP packets with the smallest packet size and largest packet size. This is because of packet header overload of inter-layer processing overhead.

According to various embodiments of the present invention, it is possible to reduce signaling among the GW-C, SDN controller, and SDN switch in view of size expansion instead of reduction of processing times in association with control message exchange between the control and data planes in the SDN as well as reduction of idle-to-active and active-to-idle state transition events that occupy over 90% of total signaling in an SDN.

Figure 2:
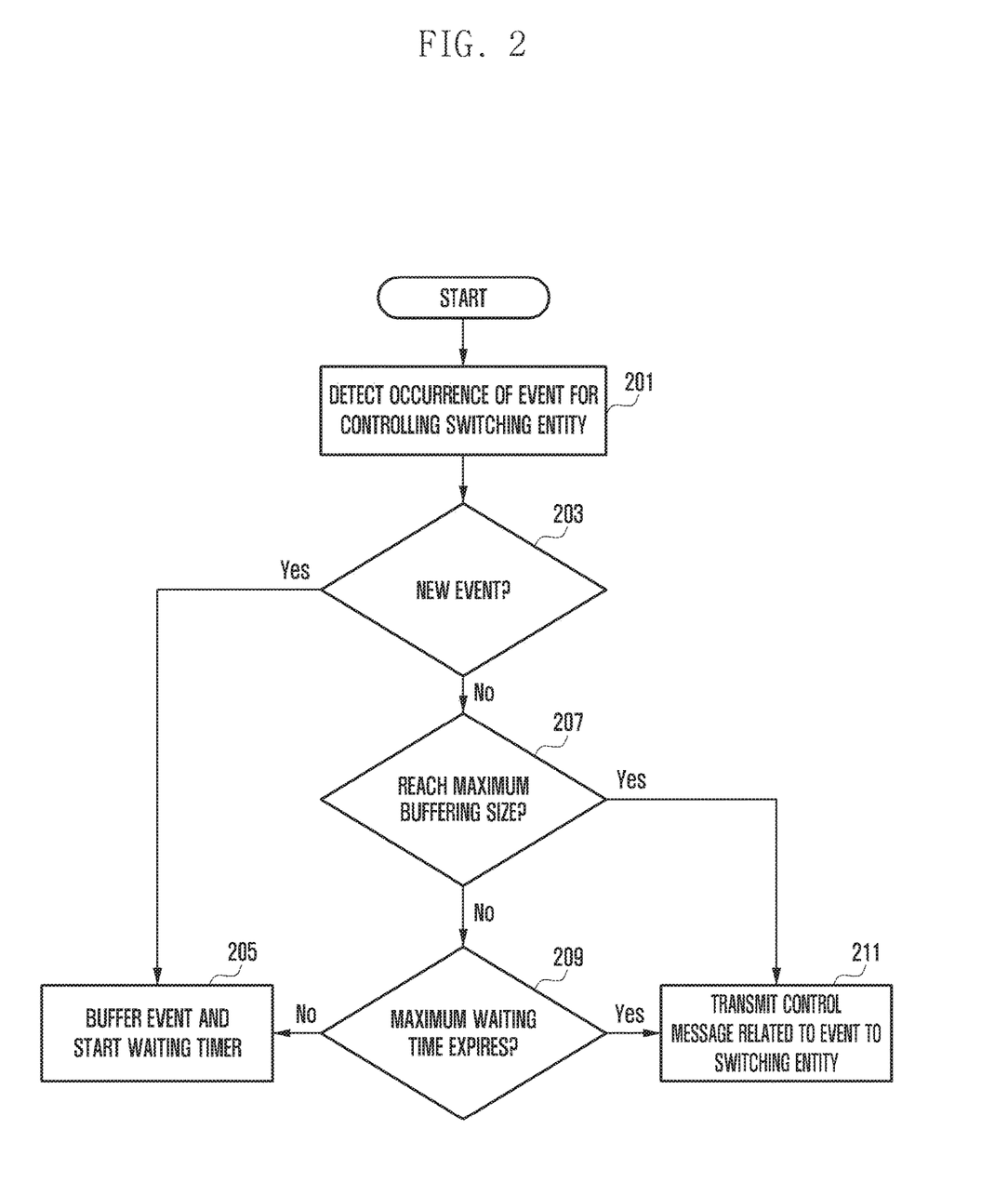
FIG. 2 is a flowchart illustrating a control message transmission method of a control entity according to an embodiment of the present invention.

FIG. 2 is a flowchart illustrating a control message transmission method of the control entity 115 according to an embodiment of the present invention. The control entity 115 may include at least one of a GW-C and an SDN controller, and the control message transmission method according to this embodiment may be implemented by at least one of the GW-C and the SDN controller.

In the case where the GTP User Plane Tunnel creation or update procedure is performed by a PDN connection (or EPC session) or bearer in the EPC network as specified in the standard, the control entity 115 may optimize control message transmission through the following operation procedure.

At step 201, the control entity 115 may detect occurrence of at least one event (e.g., GTP User Plane Tunnel creation or update event) in association with the UE 100. For example, the control entity 115 may detect an active state transition event (modify bearer request) or idle state transition event (release access bearer request) of the UE 100 from the MME 110. The eNB 105 may provide multiple UEs 100 with radio access services and thus the control entity 115 may detect a plurality of events related to the multiple UEs 100.

At step 203, the control entity 115 may determine whether the detected event is a new event. The control entity 115 may determine whether the event is new in view of the control entity 115, the UE, or the session of the UE (e.g., Internet and IMS).

If it is determined that the detected event is a new event, the control entity 115 may buffer the detected event and start a waiting timer at step 205.

If it is determined that the detected event is not a new event, the control entity 115 may determine at step 207 whether the buffering has reached a maximum buffering size. The maximum buffering size may be set arbitrarily or in consideration of a buffer size, or an IP packet size. Whether the buffering has reached the maximum buffering size may be determined in view of the total events, UE-specific events, or session-specific events of the UE.

If it is determined that the buffering has reached the maximum buffering size, the control entity 115 may transmit a control message related to the buffered event to the switching entity 120 at step 211. For example, the control message may include a control message for creating or updating a GTP User Plane Tunnel.

If it is determined that the buffering has not reached the maximum buffering size, the control entity 115 may determine at step 209 whether a maximum waiting time has expired. The maximum waiting time expiry determination may be made based on the waiting timer started previously. If it is determined that the maximum waiting timer has expired, the control entity 115 may transmit the control message related to the buffered events to the switching entity 120 at step 211. If it is determined that the maximum timer has not expired, the control entity 115 may continue buffering events at step 205. Afterward, if the maximum waiting time expires, the control entity 1150 may transmit the control message related to the buffered events to the switching entity 120.

Figure 3:
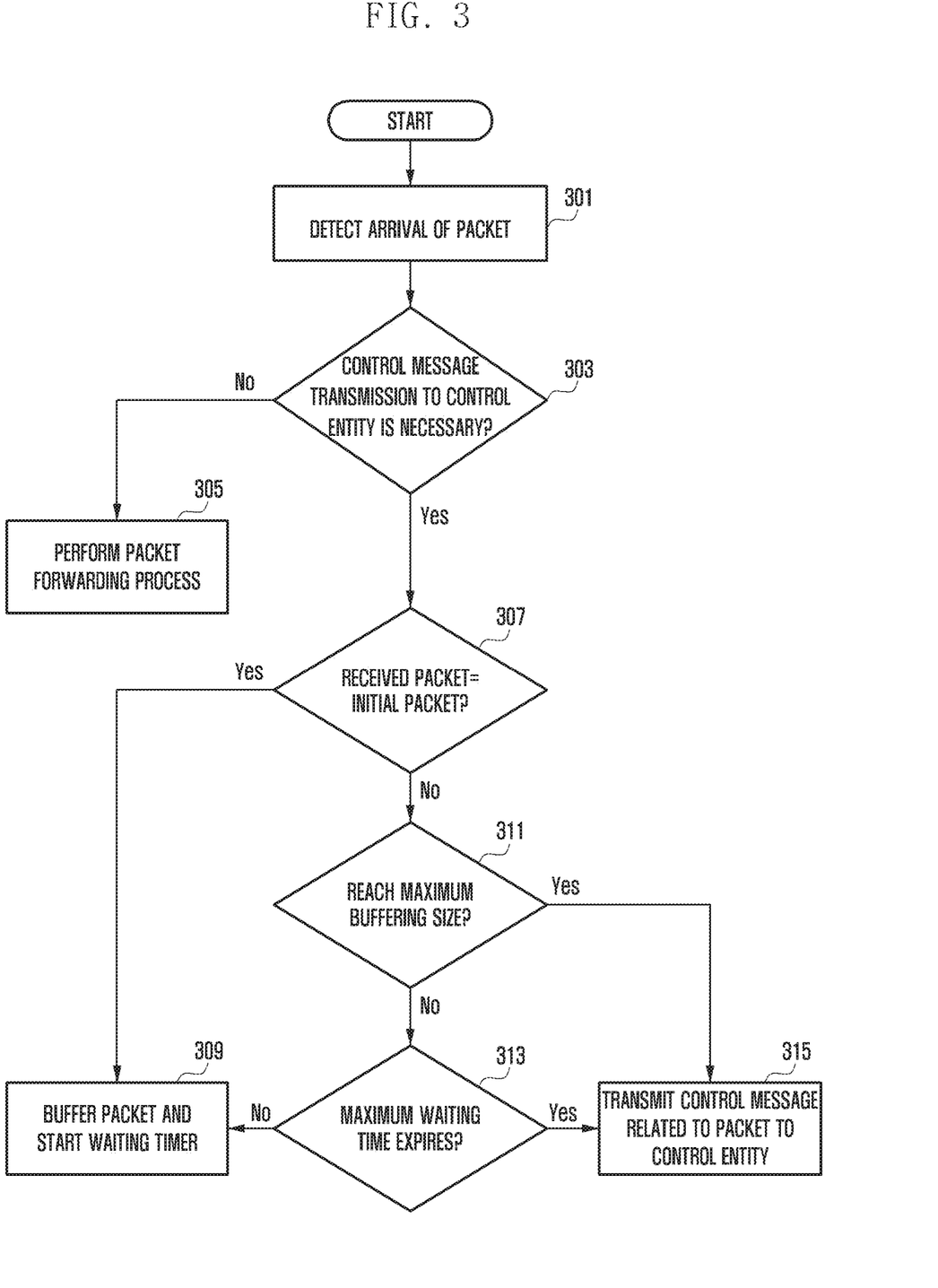
FIG. 3 is a flowchart illustrating a control message transmission method of a switching entity according to an embodiment of the present invention.

FIG. 3 is a flowchart illustrating a control message transmission method of the switching entity 120 according to an embodiment of the present invention.

In the case that the switching entity 120 transmits a control message to the control entity 115 in the EPC network, it may be possible to optimize the control message through the following operation procedure.

At step 301, the switching entity 120 may detect arrival of a packet incoming from an external network.

The switching entity 120 may determine at step 303 whether the incoming packet needs to be controlled by the control entity 115, i.e., whether to transmit a control message to the control entity 115. For example, if no Flow Table Entry exists or a Network Initiated Service Request procedure is required, this may mean that there is involvement of the control entity 115.

If it is not necessary to transmit a control message to the control entity 115, the switching entity 120 may perform a forwarding process on the corresponding packet at step 305.

If it is necessary to transmit a control message to the control entity 115, the switching entity 120 may determine at step 307 whether the corresponding packet is an initial packet. The initial packet determination may be made in view of the switching entity, the UE, or the session (e.g., Internet and IMS) or bearer of the UE.

If it is determined that the packet is the initial packet, the switching entity 120 may buffer the detected packet and start a waiting timer at step 309.

Although not shown in the drawing, if it is necessary to transmit a control message to the control entity 115, the switching entity 120 may determine whether a delay value of the MME 110, which is indicated by a control message received from the control entity 115, or a pre-configuration time set by the operator has expired. If the delay value or the pre-configuration time has expired, the switching entity 120 may transmit a control message related to the corresponding packet to the control entity 115.

If it is determined that the corresponding packet is not an initial packet (also, if the delay value or pre-configuration time has not expired), the switching entity 120 may determine at step 311 whether a number of arrived packets has reached the maximum buffering size. The maximum buffering size may be set arbitrarily or in consideration of a buffer size or an IP packet size. Whether the number of arrived packets has reached the maximum buffering size may be determined in view of all packets, UE-specific packets, or session-specific or bearer-specific packets of the UE.

If it is determined that the number of arrived packets has reached the maximum buffering size, the switching entity 120 may transmit a control message related to the buffered packets to the control entity 115 at step 315.

If it is determined that the number of arrived packets has not reached the maximum buffering size, the switching entity 120 may determine at step 313 whether a maximum waiting time has expired. The maximum waiting time expiry determination may be made based on the waiting timer started previously. If it is determined that the maximum waiting time has expired, the switching entity 120 may transmit a control message related to the buffered packets to the control entity 115 at step 315. If it is determined that the maximum waiting time has not expired, the switching entity 120 may continue buffering packets at step 309. Afterward, if the maximum waiting time expires, the switching entity 115 may transmit the control message related to the buffered packets to the control entity 115.

If a control message is received from the switching entity 120, the control entity 115 may transmit a downlink data notification to the MME 110 to control data forwarding of the switching entity 120.

Figure 4:
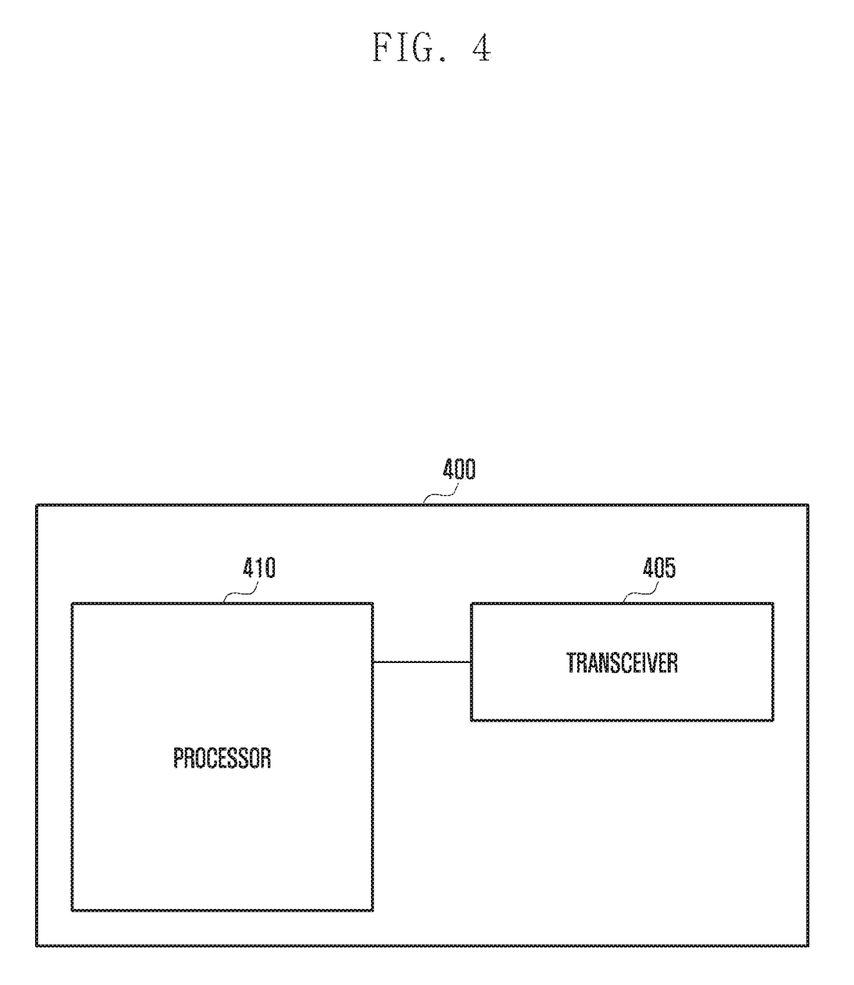
FIG. 4 is a schematic block diagram illustrating a configuration of a control entity according to an embodiment of the present invention.

FIG. 4 is a schematic block diagram illustrating a configuration of a control entity (e.g., control entity 115) according to an embodiment of the present invention.

In reference to FIG. 4, the control entity 400 may include a transceiver 405 and a processor 410.

The transceiver 405 may communicate signals with an MME (e.g., MME 110) and a switching entity (e.g., switching entity 120).

According to various embodiments of the present invention, the processor 410 may control the control entity 400 to perform the operations described with reference to FIGS. 2 and 3. The processor 410 may control the transceiver 405 to transmit and receive signals to and from the MME and switching entity. For example, the processor 410 may detect occurrence of at least one event related to at least one UE and buffer the at least one event until a predetermined condition is fulfilled. The processor 410 may also control the transceiver 405 to transmit a control message corresponding to the at least one buffered event when the predetermined condition is fulfilled.

For example, the predetermined condition may include that the buffering reaches a maximum buffering size. Also, the predetermined condition may include that a maximum waiting time expires. The processor 410 may start a timer for measuring the maximum waiting time when a new event occurs.

The processor 410 may determine whether the predetermined condition is fulfilled in view of the total events, UE-specific events, or session-specific events of the UE.

The processor may include at least one of a GW-C and a SDN controller, and the above-described operations of the processor 410 according to this embodiment may be implemented by means of at least one of the GW-C and the SDN controller.

Figure 5:
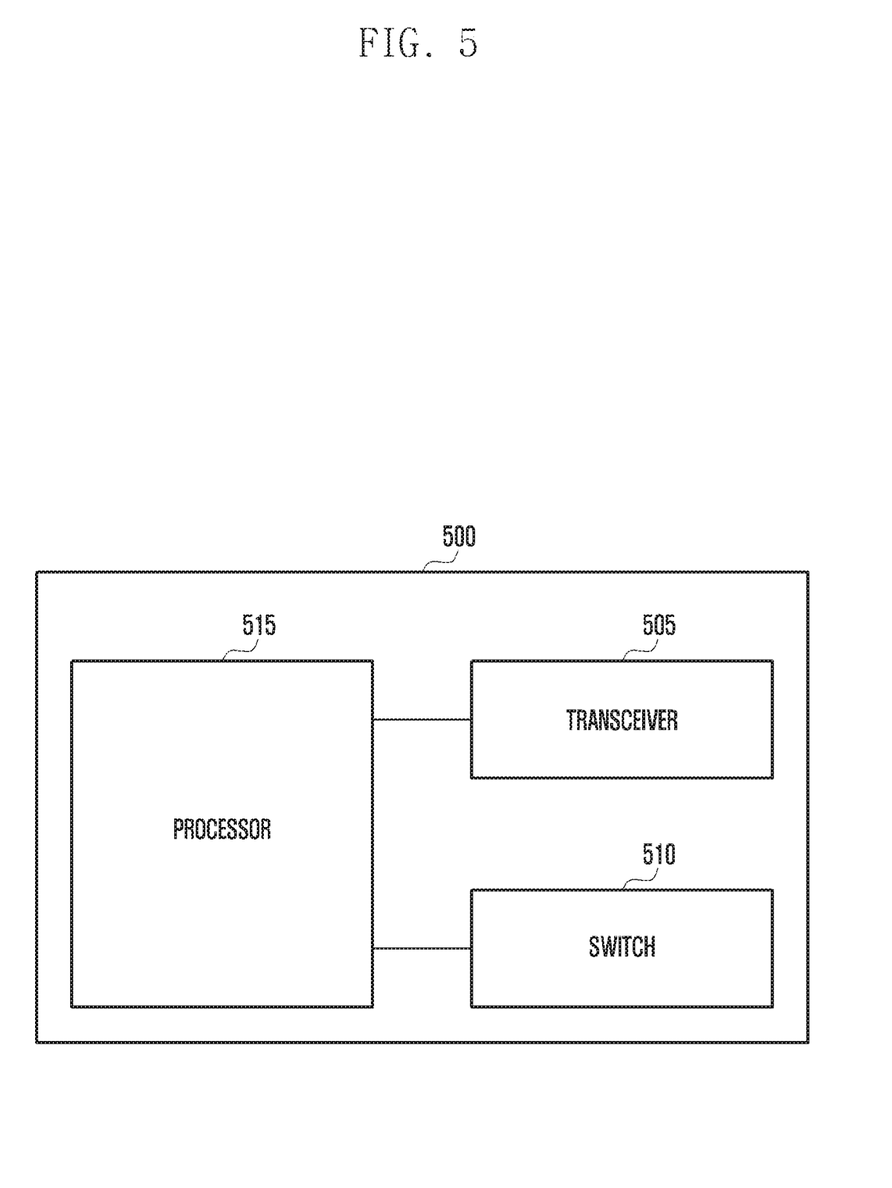
FIG. 5 is a schematic block diagram illustrating a configuration of a switching entity according to an embodiment of the present invention.

FIG. 5 is a schematic block diagram illustrating a configuration of a switching entity (e.g., switching entity 120) according to an embodiment of the present invention.

In reference to FIG. 5, the switching entity 500 may include a transceiver 505, a switch 510, and a processor 515.

The transceiver 505 may communicate signals with a control entity (e.g., control entity 115).

The switch 510 may transmits a packet arriving from an external network to the UE 100 via an eNB (e.g., eNB. 105).

The processor 515 may control the switching entity 500 to perform the operation described with reference to FIGS. 2 and 3. The processor 515 may control the transceiver 505 to transmit and receive a signal to and from the control entity. The processor 515 may control the switch 510 to switch the packet incoming from the external network to the eNB.

For example, the processor 515 may detect arrival of incoming packets of the terminal from the external network and buffer the packets until a predetermined condition is fulfilled. If the predetermined condition is fulfilled, the processor 515 may control to transmit a control message corresponding to the buffered packets to the control entity.

For example, the predetermined condition may include at least one of that the buffering reaches a maximum buffer size and that a maximum waiting time expires. The processor 515 may start a timer for measuring the maximum waiting time upon detection of arrival of a new packet.

The processor 515 may determine whether a delay value of an MME, which is indicated by a control message received from the control entity, or a pre-configuration time set by the operator has expired and, if the delay value or the pre-configuration time has expired, transmit a control message related to the corresponding packet to the control entity.

For example, the processor 515 may determine whether the predetermined condition is fulfilled in view of all-packets, UE-specific packets, or session-specific or bearer-specific packets of the UE.

If the processor 515 detects arrival of a packet, it may determine whether to transmit a control message to the control entity and, if it is not necessary to transmit the control message, perform a forwarding process on the packet without buffering the packet.

According to various embodiments of the present invention, it may be possible to deliver a control signal corresponding to a bundle of events occurring persubscriber or for a predetermined time period between the GW-C and the SDN controller for the GTP signaling occurring by a PDN connection according to the 3GPP standard.

It may also be possible to deliver a control signal corresponding to a bundle of events occurring per subscriber or for a predetermined time period between the SDN controller and the SDN switch for the GTP signaling occurring by a PDN connection according to the 3GPP standard.

According to various embodiments, it may be possible to deliver a control signal corresponding to a bundle of events occurring persubscriber or for a predetermined time period for PDN connection-specific events occurring without a GTP transaction at an interface such as a Gx and Gy interfaces.

According to various embodiments of the present invention, it may be possible to deliver a control signal corresponding to a bundle of events occurring persubscriber or for a predetermined time period for PDN connection-specific or bearer-specific (Flow Entry Group-specific) events occurring at the SDN switch.

The embodiments disclosed in the specification and drawings are proposed to help explain and understand the present invention rather than to limit the scope of the present invention. It is therefore intended that the following claims be interpreted to include all alterations and modification made to the disclosed embodiments that fall within the sprit and scope of the invention.

What is claimed is:

1. A method of a control entity in a software defined network-based mobile communication system, the method comprising:
   detecting first event related to at least one terminal;
   buffering the detected first event and starting a waiting timer;
   detecting at least one second event related to the at least one terminal;
   identifying whether a maximum buffering size is reached;
   in case that the waiting timer is not expired, buffering the detected at least one second event; and
   in case that the maximum buffering size is reached or the waiting timer is expired, transmitting a control message corresponding to the first event and the at least one second event,
   wherein a flow table entry of a switching entity is updated based on the control message,
   wherein the control message includes a message for creating or updating a user plane tunnel, and
   wherein the identification of whether the maximum buffering size is reached is based on user equipment (UE) specific packets, session-specific, and bearer-specific packets of the UE.

2. The method of claim 1, wherein the control entity comprises at least one of a gateway controller and a software defined network (SDN) controller.

3. A method of a switching entity in a software defined network-based mobile communication system, the method comprising:
   detecting arrival of a first packet related to at least one terminal from an external network;
   buffering the first packet and starting a waiting timer;
   detecting arrival of at least one second packet related to the at least one terminal from the external network;
   identifying whether a maximum buffering size is reached;
   in case that the waiting timer is not expired, buffering the at least one second packet; and
   in case that the maximum buffering size is reached or the waiting timer is expired, transmitting a control message corresponding to the first packet and the at least one second packet,
   wherein a downlink data notification is transmitted from a control entity to a mobility management entity based on the control message,
   wherein the control message includes a message for creating or updating a user plane tunnel, and
   wherein the identification of whether the maximum buffering size is reached is based on user equipment (UE) specific packets, session-specific, and bearer-specific packets of the UE.

4. The method of claim 3,
   wherein in case that a delay value of the mobility management entity is expired, the control message corresponding to the first packet and the at least one second packet is transmitted to the control entity.

5. The method of claim 3, further comprising:
   determining, upon detection of the arrival of the first packet, whether the control message needs to be transmitted; and
   performing, in case that the control message does not need to be transmitted, a forwarding process on the first packet.

6. A control entity of a software defined network-based mobile communication system, the control entity comprising:

a transceiver configured to transmit and receive signals; and a processor configured to:
  detect a first event related to at least one terminal,
  buffer the detected first event and start a waiting timer,
  detect at least one second event related to the at least one terminal,
  identifying whether a maximum buffering size is reached,
  in case that the waiting timer is not expired, buffer the detected at least one second event, and
  in case that the maximum buffering size is reached or the waiting timer is expired, transmit a control message corresponding to the first event and the at least one second event,
wherein a flow table entry of a switching entity is updated based on the control message,
wherein the control message includes a message for creating or updating a user plane tunnel, and
wherein the identification of whether the maximum buffering size is reached is based on user equipment (UE) specific packets, session-specific, and bearer-specific packets of the UE.

7. A switching entity of a software defined network-based mobile communication system, the switching entity comprising:
  a transceiver configured to transmit and receive signals;
  a switch configured to switch packet forwarding; and
  a processor configured to:
    detect arrival of a first packet related to at least one terminal from an external network,
    buffer the first packet and start a waiting timer,
    detect arrival of at least one second packet related to the at least one terminal from the external network,
    identify whether a maximum buffering size is reached,
    in case that the waiting timer is not expired, buffer the at least one second packet, and
    in case that the maximum buffering size is reached or the waiting timer is expired, transmit a control message corresponding to the first packet and the at least one second packet,
  wherein a downlink data notification is transmitted from a control entity to a mobility management entity based on the control message,
  wherein the control message includes a message for creating or updating a user plane tunnel, and
  wherein the identification of whether the maximum buffering size is reached is based on user equipment (UE) specific packets, session-specific, and bearer-specific packets of the UE.

8. The switching entity of claim 7, wherein in case that a delay value of the mobility management entity is expired, the control message corresponding to the first packet and the at least one second packet is transmitted to the control entity.

9. The switching entity of claim 7, wherein the processor is further configured to:
  determine, upon detection of the arrival of the first packet, whether the control message needs to be transmitted, and
  perform, in case that the control message does not need to be transmitted, a forwarding process on the first packet.

* * * * *